United States Patent [19]

Ballas, Sr.

[11] 4,282,652
[45] Aug. 11, 1981

[54] APPARATUS FOR CUTTING VEGETATION

[75] Inventor: George C. Ballas, Sr., Houston, Tex.

[73] Assignee: Emerson Electric Co., St. Louis, Mo.

[21] Appl. No.: 796,906

[22] Filed: May 13, 1977

[51] Int. Cl.³ .............................................. A01D 56/00
[52] U.S. Cl. ........................................ 30/276; 56/12.7
[58] Field of Search ............... 30/276, 296 R; 56/12.7

[56] References Cited

U.S. PATENT DOCUMENTS

| D. 252,130 | 6/1979 | Hoff | 56/12.7 X |
| 2,697,457 | 12/1954 | Lawrence | 30/276 X |
| 3,346,955 | 10/1967 | Beneke | 30/296 R |
| 3,977,078 | 8/1976 | Pittinger | 30/276 |
| 4,226,021 | 10/1980 | Hoff | 30/276 |

*Primary Examiner*—Jimmy C. Peters

*Attorney, Agent, or Firm*—Hubbard, Thurman, Turner, Tucker & Glaser

[57] ABSTRACT

An improved apparatus for cutting vegetation, comprising a motor and a rotating cutting head mounted at the ends of a support tube. One or more flexible non-metallic lines extend into a cutting plane from the cutting head. Unique first and second tubular handle members carrying cylindrical handgrips at their free ends are secured by a clamp to a straight portion in the support tube. These handle members have straight and curved portions arranged in combination so that the handgrips reside in a common horizon and with substantially the same angular displacement at the user's hands with the cutting head positioned directly in front of the user's body. With this improved apparatus the user has a comfortable stance with the cutting head before him and can make equal left and right swings without any undue strain or effort during vegetation cutting.

27 Claims, 6 Drawing Figures

APPARATUS FOR CUTTING VEGETATION

BACKGROUND OF THE INVENTION

1. Field of the Invention

This invention relates to the cutting of vegetation, and more particularly, it relates to the cutting of vegetation using a flexible non-metallic line extending from a rotating head into a cutting plane.

2. Description of the Prior Art

For many centuries man has struggled in the cutting of vegetation, using knives, scythes, clippers, and various other metal cutting blades. These manual devices in many cases are very awkward to use and produce serious strains upon the user's body. For example, the scythe is an implement consisting of a long, curved single-edged metal blade with a long bent handle having two handgrips to be grasped by the user. The scythe is used in a sideways swinging motion for mowing, reaping and other cutting. The scythe was a substantial improvement over plain knives, hooks and sickles in that the user was able to use both hands in making left and right substantially equal swings during the cutting operation. However, the swing to the left consumed the most energy of the work in cutting vegetation. Nevertheless, there was a balance of rythmic movement making the scythe superior as a cutting instrument to the sickle and other single-bladed, single-handed devices.

Invention of the reaper-type harvesting machinery during the mid-nineteenth century freed most of the workers from the great physical labors of manual cutting instruments for harvesting crops. As a result, the hand-held cutting devices, such as sickles and shears, were retained for trimming, edging and grass cutting in small areas. The twentieth century created a large group of homeowners doing grass cutting, trimming, clipping and the like in their own yards. During this period, the gasoline and electrically powered lawnmowers, trimmers and edgers replaced the earlier manual cutting device. These powered devices employed rotating metal cutting blades which could inflict serious and terrible injury to the user upon accidental contact. Nearly one hundred thousand users of metal-bladed power equipment are injured annually.

In about 1960 there was developed in Europe a trimmer-edger unit employing a flexible polymeric line extending from a rotating head for cutting vegetation. The unit did not work properly because of several defects in structure and operating perameters. In the United States of America during the 1970's, there were patented practical vegetation cutting devices using flexible non-metallic lines carried upon a rotating head. The devices are shown in U.S. Pat. Nos. 3,708,967, 3,826,068, and 3,859,776. These patented devices have met outstanding success worldwide in the marketplace. One reason for this success is that they are probably the safest electric or gasoline powered tools yet invented for vegetation cutting, edging and trimming operations.

The patents 3,708,967 and 3,826,068 disclose one embodiment of the unique apparatus driven by a gasoline engine, for rotating a head carrying one or more flexible non-metallic lines which are extended in a cutting plane for removal of vegetation. These powered devices are relatively large and are held by the user using a two-handed grip much like the historic scythe. The user also has an over-the-shoulder strap to help balance these devices while cutting vegetation. The two-handed grip is provided by a U-shaped handle secured at its center point to the support tube of the apparatus. The handgrips extend upwardly on the handle. The operator grasps the upstanding handle grips with his elbows bent but his hands extending in front of his body. As a result, the user swings his body at the waist in order to move the cutting head sideways or laterally through the vegetation during the cutting operation. Unfortunately, the handle is a handicap since the user loses some of the balanced swinging motion by foot movement available in the centuries-old scythe.

Many powered trimming, edging and cutting devices have been proposed which include various forms of two-handed grips with less than optimum desired characteristics. Namely, the operator must extend his arms directly in front of him; thus, his swings to left and right are not equal and comfortable while using these devices.

The scythe appears natural in rythmic movement to a user who has dancing abilities. More particularly, a dancer finds the left (cutting) swing of the scythe to be natural. However, the right (return) swing of the scythe is uncomfortable, since the scythe must swing towards the right leg which is slightly forward of his body. Preferably, the dancer would have both arms at a comfortable side-by-side position, make equal left and right swings of the scythe, or other tool, in comfortable movements, and balance his weight on both feet. These principles of a dancer in comfortable movements have been carried forward into arranging a novel handle member for motor-powered flexible-line cutting devices such as described in the afore-mentioned patents.

SUMMARY OF THE INVENTION

In accordance with this invention, there is provided an improved apparatus for cutting vegetation. A motor is mounted on a support tube having a substantially straight portion. The support tube also carries a cutting head which is mounted for rotation. The head carries at least one flexible non-metallic line extending into a cutting plane upon rotation of the head. A drive connection between the motor and the cutting head provides the necessary rotating mechanism for the apparatus. First and second handle members, which carry handgrips at their free ends, are secured to the straight portion of the support tube by a clamp. The first and second handle members have lengths and non-linear portions arranged in novel combination so that the handgrips reside in a common horizon relative to the user's hands when hanging naturally at the sides of his body. Each handgrip has substantially the same angular displacement relative to a horizontal plane at the user's hands. Further, each handgrip has substantially the same angular displacement relative to a vertical plane passing through the shoulders of the user's body with the cutting head positioned directly in front of the user's body.

In more specific embodiments of the invention, the handle members are adjusted to provide the same advantageous results whenever the cutting head is tilted for cutting, edging or trimming operations. Also, the handle members are adjusted so that the same advantageous results are obtained for any user, irrespective of his height or arm length.

DESCRIPTION OF SPECIFIC EMBODIMENTS

Figure 1:
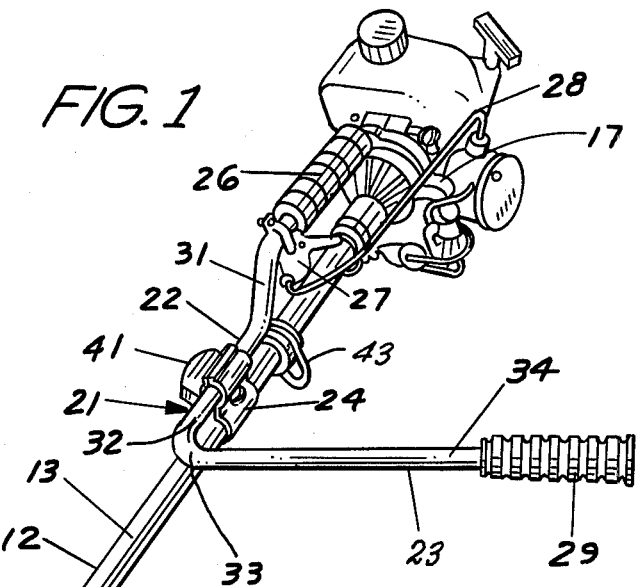
FIG. 1 is a pictorial view illustrating the improved apparatus for cutting vegetation of the present invention.

Referring now to FIG. 1, there is shown one embodiment of the improved apparatus arranged according to the present invention. The apparatus 11 has a support tube 12 with a substantially straight portion 13 and a curved portion 19. A cutting head 14 is journaled at one end of the tube 12 by a bearing 16. The tube 12 carries at its other end a gasoline powered motor 17, although an electric motor can be used. A flexible drive connection (not shown) extends within the tube 12 from the motor 17 to the head 14. The motor 17 rotates the head 14, causing flexible non-metallic cutting lines 18 to be extended outwardly into a cutting plane.

Although the head 14 may carry only one cutting line 18, two or more of these lines are usually carried on the head 14 when using a gasoline powered motor. Preferably, the head 14 carries an even number of the cutting lines 18 disposed in an equal angular spacing for dynamic balance in rotation. The cutting lines 18 can be extruded from monofilament polymeric material such as Nylon ® polymer. Good results are obtained with the cutting line 18 being a Nylon ® filament with a diameter of between 0.065 and 0.080 inches. However, the cutting line 18 may have diameters of somewhat lesser or greater dimensions than the stated range and yet perform in an acceptable fashion. Rotation of the head 14 causes the cutting lines 18 to extend substantially radially several inches (e.g., 5-10 inches) into the cutting plane.

Preferably, the support tube 12 includes the curved portion 19 of angular arrangement to position the cutting plane subscribed by the cutting lines 18 in the horizontal during cutting operations. Selection of the proper curvature for the portion 19 in the tube 12 permits the apparatus 11 to be used not only for cutting but also for edging and trimming operations.

The motor 17 usually rotates the head 14 at an angular velocity to place the tip velocity of the extended cutting lines 18 into the range of between about 14,000 to about 26,000 feet per minute. Reference may be taken to U.S. Pat. No. 3,859,776 for a definition of a preferred range of tip velocities for cutting lines on the head to produce the best cutting conditions.

A novel handle assembly 21 is secured to the support tube 12 so that the user controls the apparatus 11 in a unique manner not previously found in known earlier vegetation cutters. In particular, the handle assembly 21 is formed of a right handle 22 and a left handle 23, which handles have unique lengths and curved portions. The handle assembly is secured to the support tube by a clamp 24.

The right handle 22 carries a handgrip 26 which may support a gas throttle 27. A control cable 28 extends from the throttle 27 to the motor 17. The user's right hand grasps the grip 26 and one or more fingers activate the throttle 27 to control the speed of the motor. The motor's speed determines the angular velocity at which the head 14 is being rotated. The left handle 23 carries a grip 29 for the user's left hand.

The novel handle assembly 21 employs the handles 22 and 23 with lengths and non-linear portions arranged in combination so that (1) the grips 26 and 29 reside in a common horizon relative to the user's body, (2) each grip has substantially the same angular displacement relative to a horizontal plane at the user's hands, and (3) each grip has substantially the same angular displacement relative to a vertical plane passing through the shoulders of the user's body with the cutting head 14 positioned directly in front of the user's body.

The handles 22 and 23 can have various arrangements of length and non-linear portions to produce these desired results. The drawings illustrate a preferred arrangement of these elements to produce this novel result. It will be appreciated that the distribution of mass provided by the motor 17, the support tube 12 and the cutting head 14 produce a center of gravity along the straight portion 13 of the support tube 12. Preferably, the handle assembly 21 is connected to the support tube 12 so that the grips reside closely adjacent the center of gravity. This handle arrangement provides for a balanced control of the apparatus 11 during use.

The right handle 22 extends from the clamp 24 in a direction towards the motor 17 and in substantial parallel alignment with the support tube 12. The handle 12 has a length such that the grip 26 is positioned adjacent the motor 17. An intermediate offset portion 31 places the grip 26 a small distance from the straight portion 13 of the support tube. The offset portion 31 provides suitable clearance for the throttle 27 from the tube 12. For example, the grip 26 may be spaced about three inches from the support tube.

The left handle 23 in a first portion 32 extends a short distance from the clamp 24 towards the head 14 of the apparatus 11. The first portion 32 of the handle 23 may be straight and connects directly to a curved or arcuate second portion 33. The secod portion 33 connects to an angularly-disposed third portion 34 upon which the grip 29 is carried. For example, the first portion and arcuate second portion 33 may have an angular displacement of less than right angles; and, an angular displacement of less than about twenty degrees may exist between the arcuate second portion 33 and the third portion 34 carrying the hand grip 29. The several portions of the handle 23 are so arranged in combination that the grip 29 resides at the certain spacial relationship relative to the grip 26 of the right handle 22. In addition, the several portions of these handles in combination place the head 14 of the apparatus 11 directly in front of the user when his hands are at a natural downward position at his sides.

Figure 2:
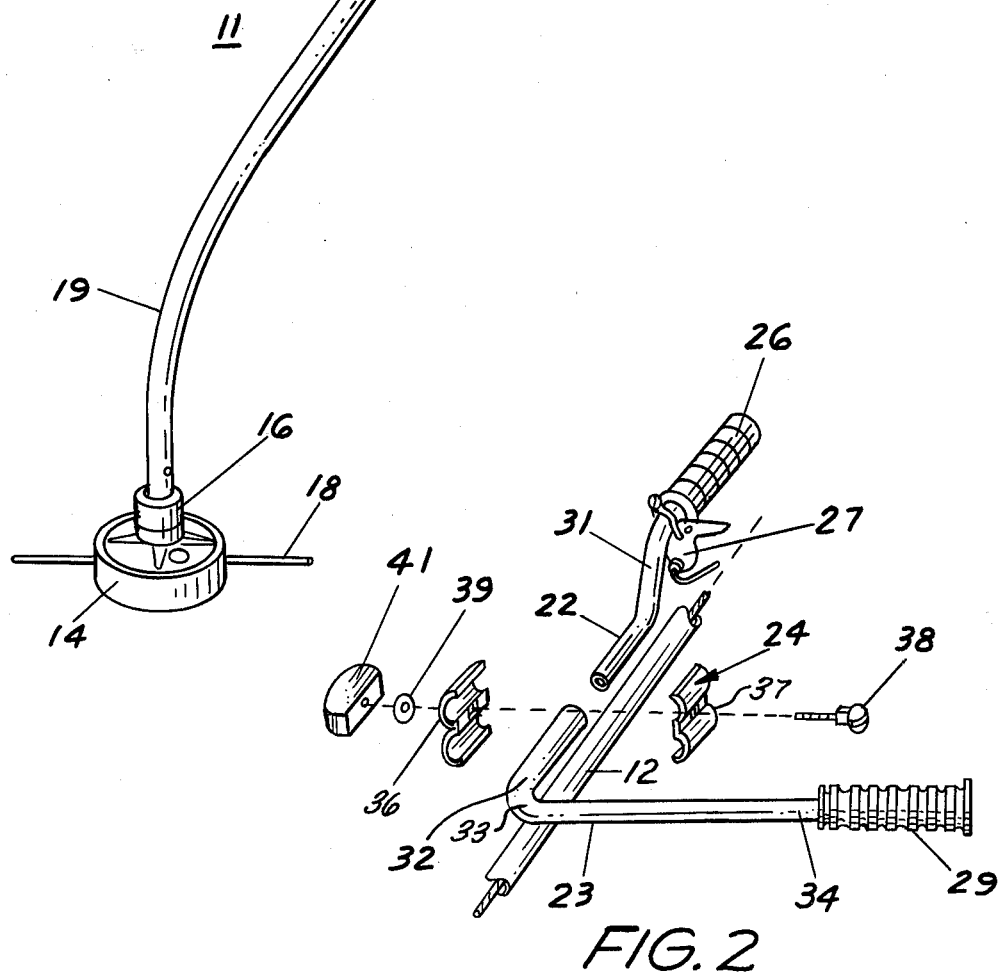
FIG. 2 illustrates, in enlargement and disassembled arrangement, the novel handle members shown in FIG. 1.

Referring to FIG. 2, wherein like elements bear like numerals, the preferred construction of the handle assembly 21 will be given in more detail. The handles 22 and 23 are tubular and journaled for rotation within the clamp 24. Good results are obtained with the clamp 24 having cylindrical jaw members 36 and 37 to engage both the handles and the straight portion 13 of the support tube 12. The rotary interconnection between the handles and the clamp 24 can be provided by making the handle 23 with an enlarged diameter in the portion 32 which will telescope over the first portion of the handle 22 adjacent to the clamp 24. With this arrangement, the clamp 24 can be formed in two identical parts 37 and 36 to simultaneously secure together in compression the handles and the support tube 12. Loosening the clamp 24 permits the handles 22 and 23 to rotate relative to the support tube 12 and also to each other for independent angular displacements. The clamps 37 and 36 can be secured together by a stud 38 which traverses these members, passes through a thrustwasher 39 and carries a threaded knob 41. Thus, the knob 41 is rotated to release and tension the clamp members so that the handles can be rotated relative to one another and to the to the support tube 12.

Figure 3:
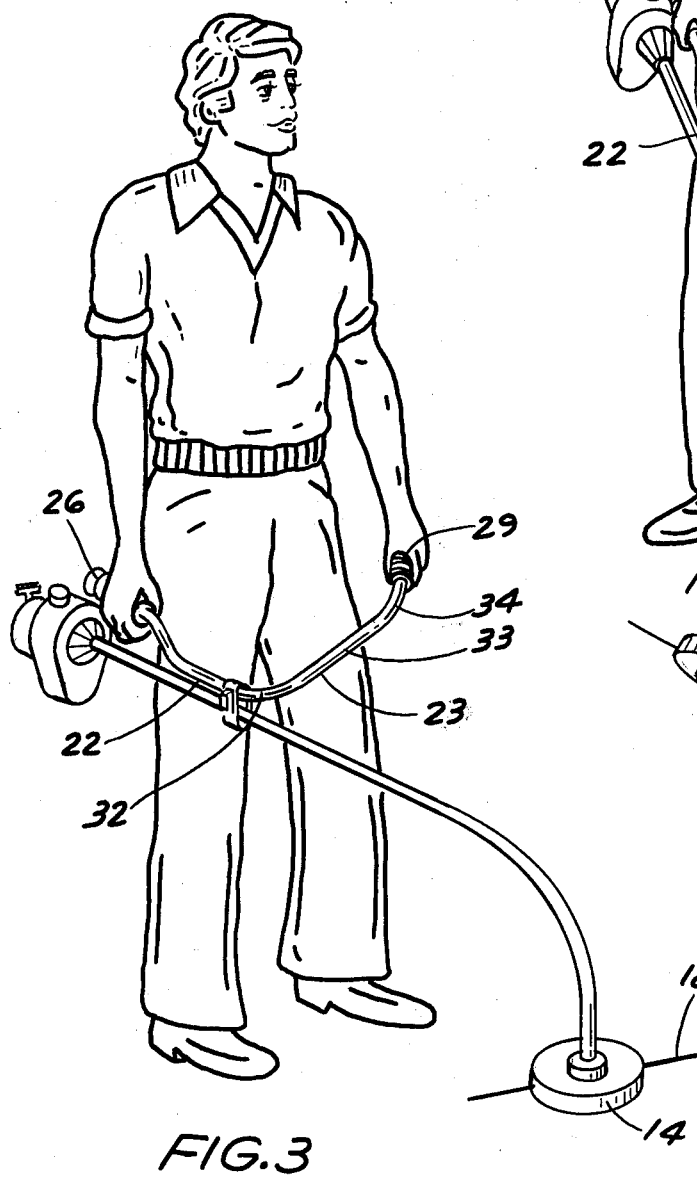
FIG. 3 illustrates the handle members adjusted on the improved apparatus for cutting operations.

In reference to FIG. 3, the handles 22 and 23 have been adjusted so that the grips 26 and 29 are comfortably grasped by the user's right and left hands, respectively, with the head 14 directly in front of the user during normal grass cutting, where the cutting plane circumscribed by the cutting lines 18 is parallel to the ground's surface.

Figure 4:
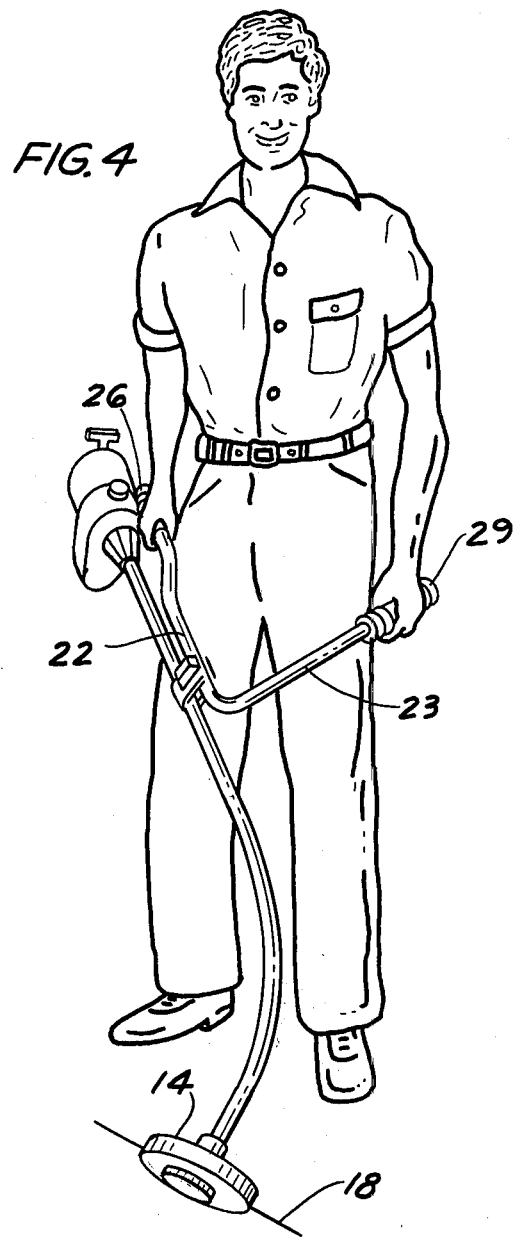
FIG. 4 illustrates the handle members adjusted on the improved apparatus for trimming operations.

Referring to FIG. 4, the apparatus 11 has the handles adjusted for trimming grass around posts, trees, borders and the like. In grass trimming, the cutting head 14 is inclined relative to the ground by approximately 30 degrees. The handles 22 and 23 have been rotated relative to the support tube 12 so that the grips 26 and 29 again reside at a position comfortably grasped by the user's hands with the head 14 directly in front of the user's body.

Figures 5, 6:
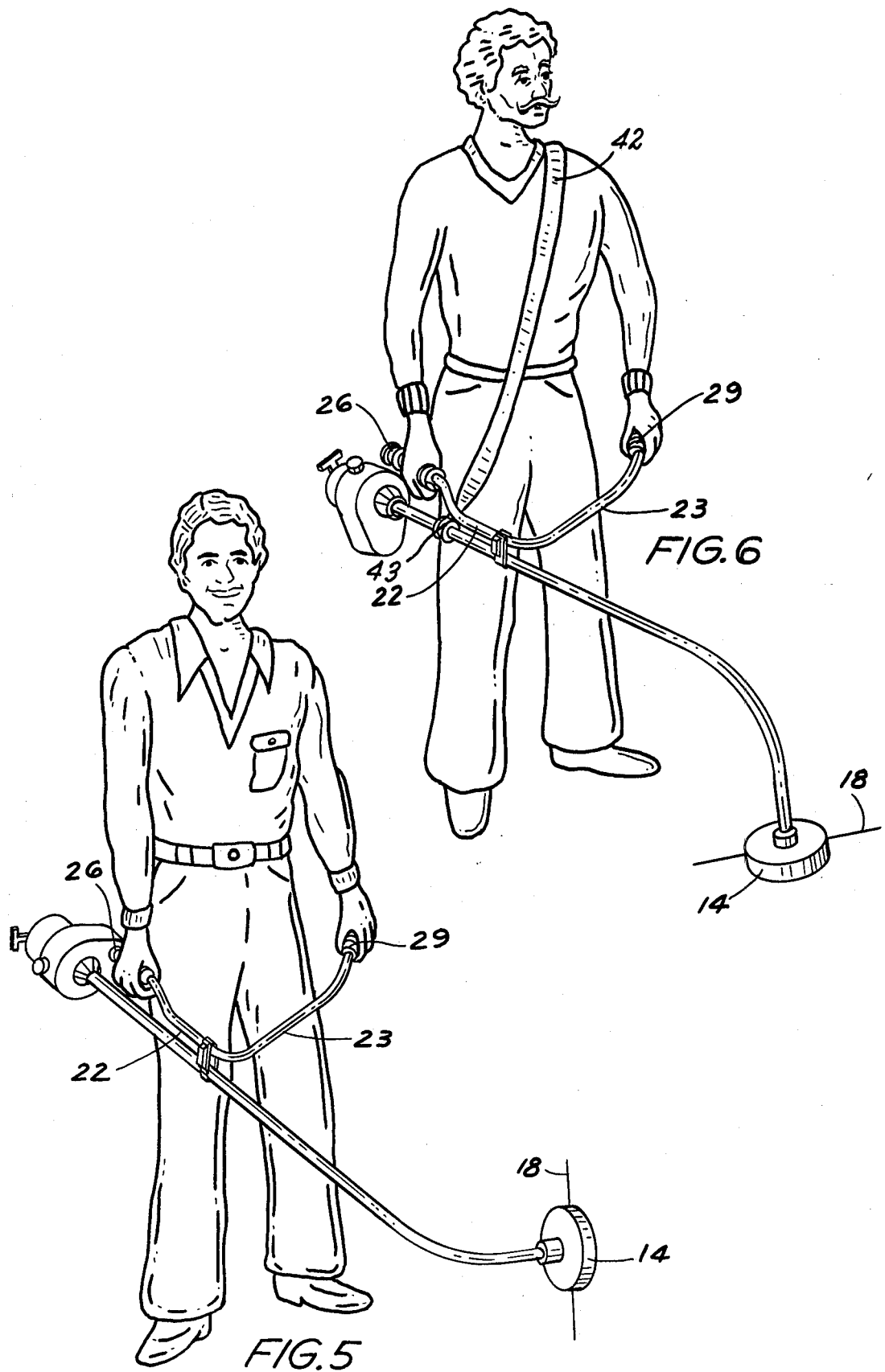
FIG. 5 illustrates the handle members adjusted on the improved apparatus for edging operations.
FIG. 6 is a view illustrating an over-the-shoulder strap used with the improved apparatus in grass cutting operations.

In reference to FIG. 5, the apparatus 11 is shown with the handle assembly 21 adjusted for edging grass. In grass edging, the cutting head 14 is rotated to bring the cutting plane subscribed by the head 14 substantially vertical to the ground. The handles 22 and 23 have been adjusted using the clamp 24 so that the grips are in position to again place the user's hands at a comfortable side-by-side body hanging position with the head 14 directly in front of the user's body.

In FIGS. 3-5, it will be apparent that not only have the handles 22 and 23 been rotated relative to the support tube 12, but additionally the handles have been rotated to some degree relative to one another. In any event, these handles have been rotated so that the handgrips 26 and 29 reside in a common horizon relative to the user's body. In addition, each of the grips 26 and 29 has substantially the same angular displacement relative to a horizontal plane at the user's hands. Further, each of the handgrips 26 and 29 has substantially the same angular displacement relative to a vertical plane passing through the shoulders of the user's body with the cutting head 14 positioned directly in front of the user's body in grass cutting, trimming or edging.

It will be apparent that the described configuration in straight and curved portions in the right and left handles can be varied from the portions which have been specifically described. The right handle 22 has an offset which permits the user to grasp the grip 26 with the right hand comfortably at his side. The offset provides sufficient clearance from the support tube to accomodate his hand and the throttle 27, if such is used. The left handle 23 has several portions adjusted relative to the right handle 22 and the support tube 12 so that the user's left hand always falls comfortably at his side in accordance with the stated relationship. The significant advantages in journaling the handles for rotation relative to one another and to the support tube 12 can be readily appreciated from the description relative the FIGS. 1-5.

In addition, there is another advantage in the construction of the handle assembly 21. Referring to FIG. 6, there is shown a user who is employing an over-the-shoulder strap 42 which is connected to a swivel 43 carried on the support tube 12. The user is of a shorter stature than in the FIGS. 3-5. The position of the handles 22 and 23 and their relationship to the support tube can be readily seen. The handle 22 has been adjusted to place the grip 26 more directly above the support tube 12. In addition, the left handle 23 has been rotated so that the user's left hand, even though he is of shorter stature, again falls on the grip 29 at a relatively comfortable position at his side. The grip 29 is in the same horizon as the grip 26 when the cutting head 14 is directly before him.

With the handle assembly 21 constructed in accordance with this invention, the user has a comfortable and equal swing to the left and right. The movement of the user's hands during the swing causes no undue strain nor does he have to move his feet from a comfortable standing position. In addition, the apparatus 11 is substantially balanced to the user's movements, as a dancer experiences with a trained assistant. In this unique manner, the unit 11 is readily moved to follow any contour of cutting, edging or trimming that the user could desire.

From the foregoing description, it will be apparent that there has been described a novel handle arrangement for an apparatus for cutting vegetation which is uniquely arranged to complement the user's anatomy and avoid awkward or uncomfortable movements during any use of the apparatus.

The improved handle assembly is of especial utility in powered apparatus using a rotating head with a nonmetallic flexible line for cutting vegetation. In particular, this improved apparatus allows equal cutting performance in left and right swings as the user desires. Irrespective of the user's height, the novel handle assembly can be adjusted to provide the same results. It will be understood that certain changes or alterations in the present improved apparatus may be made without departing from the spirit of this invention. These changes are contemplated by and are within the scope of the appended claims which define the invention. Additionally, the present description is intended to be taken as an illustration of this invention.

What is claimed is:

1. In an apparatus for cutting vegetation having a support tube including a substantially straight portion and the support tube carrying a motor, a drive connection and a cutting head mounted for rotation about an axis intersecting the straight portion of the support tube, the head carrying a cutting element extending within a cutting plane, and the motor, drive connection and cutting head providing a mass distribution wherein the center of gravity of the apparatus resides along the straight portion of the support tube and at a location spaced from the cutting head, the improvement comprising:

(a) handle means secured by a clamp upon the straight portion of the support tube adjacent the center of gravity;

(b) said handle means formed of first and second handle members with a rotary interconnection adjacent the clamp on the support tube;

(c) said first handle member extending in a direction away from said cutting head but in parallel relationship with the support tube and said first handle member having an intermediate offset portion adjacent a hand grip at the free end thereof;

(d) said second handle member extending in a first portion from said clamp toward said cutting head and having an arcuate second portion extending laterally from the first portion to an angled third portion carrying a hand grip at the free end thereof; and (e) said first and second handle members having lengths and non-linear portions arranged so that the hand grips reside spacially in a user's hands when his arms hang downwardly in a natural position along his body with said cutting head positioned substantially directly in front of the user's body.

2. The apparatus of claim 1 wherein a swivel means is secured to said straight portion of said support tube adjacent the center of gravity of the apparatus.

3. The apparatus of claim 2 wherein an over-the-shoulder strap is releasably fastened to said swivel means.

4. The apparatus of claim 1 wherein said first handle member has the intermediate offset portion arranged to position the hand grip thereon several inches laterally of the support tube.

5. The apparatus of claim 1 wherein said first handle member has the intermediate offset portion arranged to place the handgrip thereon a sufficient lateral distance from the support tube for accomodating a motor controller adapted to be operated by the user's hand when positioned upon the handgrip.

6. The apparatus of claim 1 wherein said first and second handle members are tubular and journaled for rotation within said clamp when released, and said clamp having cylindrical jaw members to engage the tubular first and second handle members.

7. The apparatus of claim 1 wherein said first and second handle members are tubular with adjacent ends at said clamp having different diameters and interconnect in a telescoped relationship for rotary movement with said clamp released.

8. The apparatus of claim 7 wherein said clamp has cylindrical jaw members to engage said first and second handle members in the telescoped region.

9. The apparatus of claim 1 wherein said first and second handle members and said support tube are tubular and said clamp has first and second cylindrical jaw members, said first and second handle members engaged with the first cylindrical jaw member and the support tube engaged with the second cylindrical jaw member.

10. The apparatus of claim 1 wherein said second handle member has the first portion extending parallel with the support tube, an angular displacement of less than right angles between said arcuate second portion and the first portion, and an angular displacement of less than about twenty degrees between the arcuate second portion and the angled third portion carrying the handgrip.

11. The apparatus of claim 1 wherein said second handle member relative to the support tube has an angular displacement of the first portion, an arcuate second portion and an angled third portion for placing the handgrip thereon in a plane intersecting the support tube at an included angle less than a right angle.

12. The apparatus of claim 1 wherein said first and second handle members have lengths and non-linear portions arranged so that the handgrips reside in a common horizon relative to the user's body.

13. The apparatus of claim 1 wherein said first and second handle members have lengths and non-linear portions arranged so that each of the handgrips has substantially the same angular displacement relative to a vertical plane passing through the shoulders of the user's body, with the cutting head positioned substantially directly in front of the user's body.

14. The apparatus of claim 13 wherein each of said handgrips has substantially the same angular displacement relative to a horizontal plane at the user's hands.

15. The apparatus of claim 1 wherein said first and second handle members have lengths and non-linear portions arranged in combination so that the handgrips reside in a common horizon relative to the user's body, each handgrip having substantially the same angular displacement relative to a horizontal plane at the user's hands, and further, each handgrip having substantially the same angular displacement relative to a vertical plane passing through the shoulders of the user's body with the cutting head positioned directly in front of the user's body.

16. An improved apparatus for cutting vegetation with a flexible non-metallic line comprising:

(a) a support tube having a substantially straight portion;

(b) a motor mounted on the support tube;

(c) a cutting head mounted on one end of the support tube for rotation about an axis, said cutting head carrying at least one flexible non-metallic line extending into a cutting plane upon rotation of said cutting head;

(d) a drive connection between said motor and said cutting head;

(e) first and second handle members of tubular construction;

(f) a clamp securing said first and second handle members upon the straight portion of said support tube;

(g) said first handle member extending in a direction away from said cutting head but in parallel relationship to said support tube, and said first handle member having an intermediate offset portion adjacent a handgrip at the free end thereof;

(h) said second handle member extending in a first portion from said clamp towards said cutting head and having an arcuate second portion extending laterally from the first portion to an angled third portion carrying a handgrip at the free end thereof; and (i) said first and second members journaled for rotation relative to one another within said clamp when released.

17. The apparatus of claim 16 wherein said clamp has cylindrical jaw members to engage said first and second handle members.

18. The apparatus of claim 16 wherein said first and second handle members are telescoped over a small length within the cylindrical jaw members of said clamp.

19. The apparatus of claim 18 wherein said clamp has additional cylindrical jaw members to engage said support tube.

20. The apparatus of claim 19 wherein said clamp carries selective tensioning means which in released condition allow relative rotary movement between each of said first and second handle members and said support tube.

21. The apparatus of claim 20 wherein said first handle member has the intermediate offset portion arranged to position the handgrip thereon several inches laterally of the support tube.

22. The apparatus of claim 21 wherein a motor controller adapted to be operated by the user's hand when positioned upon the handgrip is mounted for rotation upon the first handle member.

23. The apparatus of claim 16 wherein said second handle member has the first portion extending parallel with said support tube, an angular displacement of less than right angles between the arcuate second portion and the first portion, and an angular displacement of less than about twenty degrees between the arcuate second portion and the angled third portion carrying the handgrip.

24. The apparatus of claim 16 wherein said second handle member relative to the support tube has an angular displacement of the first portion, arcuate second portion and angled third portion for placing the handgrip thereon in a plane intersecting the support tube at an included angle less than a right angle.

25. The apparatus of claim 16 wherein said first and second handle members have lengths and non-linear portions arranged so that the handgrips reside in a common horizon relative to the user's body.

26. The apparatus of claim 16 wherein said first and second handle members have lengths and non-linear portions arranged so that each of the handgrips has substantially the same angular displacement relative to a vertical plane passing through the user's shoulders with the cutting head positioned directly in front of the user's body.

27. The apparatus of claim 16 wherein said first and second handle members have lengths and non-linear portions arranged so that each of the handgrips has substantially the same angular displacement relative to a horizontal plane at the user's hands with the cutting head positioned directly in front of the user's body.

* * * * *